(12) United States Patent
Maksymenko et al.

(10) Patent No.: US 12,530,669 B2
(45) Date of Patent: Jan. 20, 2026

(54) ACTIVITY DETECTION AT POINT OF SALE

(71) Applicant: Toshiba Global Commerce Solutions, Inc., Durham, NC (US)

(72) Inventors: Serhii Maksymenko, Kharkov (UA); Evgeny Shevtsov, Plano, TX (US)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 212 days.

(21) Appl. No.: 18/240,414

(22) Filed: Aug. 31, 2023

(65) Prior Publication Data

US 2025/0078058 A1  Mar. 6, 2025

(51) Int. Cl.
| | |
|---|---|
| *G06Q 20/20* | (2012.01) |
| *G06T 5/70* | (2024.01) |
| *G06T 7/11* | (2017.01) |
| *G06V 20/40* | (2022.01) |
| *H04N 1/387* | (2006.01) |
| *H04N 1/40* | (2006.01) |

(52) U.S. Cl.
CPC ............. *G06Q 20/208* (2013.01); *G06T 5/70* (2024.01); *G06T 7/11* (2017.01); *G06V 20/44* (2022.01); *H04N 1/3877* (2013.01); *H04N 1/40012* (2013.01); *H04N 1/40068* (2013.01); *G06T 2210/22* (2013.01)

(58) Field of Classification Search
CPC ...... G06Q 20/208; G06Q 20/18; G06Q 20/20; G06T 5/70; G06T 7/11; G06T 2210/22; G06V 20/44; H04N 1/3877; H04N 1/40012; H04N 1/40068; G07G 1/0009; G07G 1/0018; G07G 1/0045; G07G 1/0063
See application file for complete search history.

(56) References Cited

U.S. PATENT DOCUMENTS

| | | | |
|---|---|---|---|
| 7,909,248 B1 * | 3/2011 | Goncalves | G07G 1/0072 235/462.14 |
| 9,823,744 B2 | 11/2017 | Publicover et al. | |
| 11,257,226 B1 * | 2/2022 | Solh | G06F 18/22 |
| 11,482,082 B2 * | 10/2022 | Farrow | G06V 40/161 |
| 11,854,265 B2 * | 12/2023 | Pricochi | G08B 13/248 |

(Continued)

OTHER PUBLICATIONS

Venetianer, Péter L., et al. "Video verification of point of sale transactions." 2007 IEEE Conference on Advanced Video and Signal Based Surveillance. IEEE, 2007. (Year: 2007).*

*Primary Examiner* — Nathan A Mitchell
(74) *Attorney, Agent, or Firm* — Kaufman & Canoles P.C.

(57) ABSTRACT

Systems and methods of detecting activity at point of sale are provided. In one exemplary embodiment, a method is performed by a POS system having first and optical scanner devices. The optical sensor device is positioned on or about the POS system with a field of view directed towards a first spatial region of the POS system and operable to capture successive images. The optical scanner device is positioned on or about the POS system with a field of view directed towards a second spatial region disposed within the first spatial region and associated with scanning visual object identifier codes disposed on objects and operable to scan those visual object identifier codes. The method includes receiving, from the optical sensor device, a set of successive images associated with the first spatial region to enable detection of activity in or about the second spatial region.

16 Claims, 9 Drawing Sheets

(56) References Cited

U.S. PATENT DOCUMENTS

| | | | |
|---|---|---|---|
| 12,167,117 B1* | 12/2024 | Horner | G06T 7/246 |
| 2010/0059589 A1* | 3/2010 | Goncalves | G07G 1/0054 |
| | | | 382/218 |
| 2014/0003718 A1* | 1/2014 | Eid | G06T 11/60 |
| | | | 382/170 |
| 2016/0321649 A1* | 11/2016 | Dragushan | G06Q 20/3226 |
| 2022/0198886 A1* | 6/2022 | Subramanian | G08B 13/19613 |
| 2023/0037427 A1* | 2/2023 | Brakob | G06Q 20/208 |
| 2023/0056327 A1* | 2/2023 | Brakob | G07G 1/0081 |
| 2023/0316254 A1* | 10/2023 | Maan | G06Q 30/015 |
| | | | 705/18 |
| 2024/0037890 A1* | 2/2024 | Liang | G06V 10/24 |
| 2025/0029401 A1* | 1/2025 | Gomezcaballero | G08G 1/16 |

* cited by examiner

ACTIVITY DETECTION AT POINT OF SALE

BACKGROUND

Retailers use point of sale (POS) hardware and software systems to streamline checkout operations and to allow retailers to process sales, handle payments, and store transactions for later retrieval. Each POS system generally includes a number of components including a POS terminal station device and a POS bagging station device. POS bagging station devices can enable customers or retail staff to bag purchased retail items in shopping bags during checkout at the POS systems. POS terminal station devices can include a computer, a monitor, a cash drawer, a receipt printer, a customer display, a barcode scanner, or a debit/credit card reader. POS systems can also include a conveyor belt, a checkout divider, a weight scale, an integrated credit card processing system, a signature capture device, or a customer pinpad device. While POS systems may include a keyboard and mouse, more and more POS monitors use touchscreen technology. The POS software can be configured to handle a myriad of customer based functions such as product scans, sales, returns, exchanges, layaways, gift cards, gift registries, customer loyalty programs, promotions, and discounts. In a retail environment, there can be multiple POS systems in communication with a server over a network.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

Figure 1:
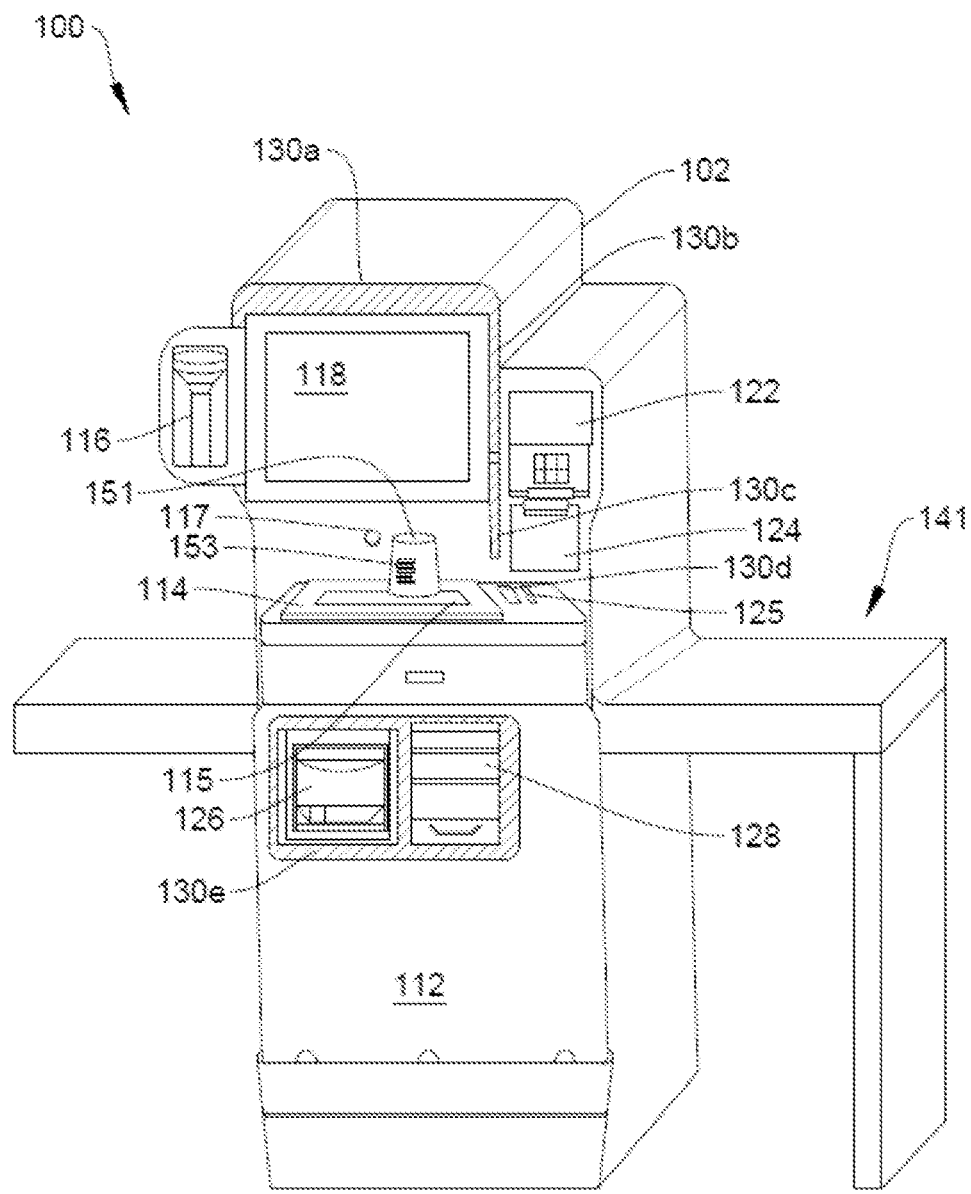
FIG. 1 illustrates one embodiment of a POS system operable to perform activity detection at point of sale in accordance with various aspects as described herein.

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details.

A computer vision system can capture video of activities associated with a self-checkout terminal and can analyze consumer interaction and behavior based on that video. Further, certain models and algorithms can be integrated at different stages in the processing of the video. These models and algorithms can extract useful information from the captured video and can process the captured video to represent various stages of consumer interaction with the self-checkout terminal. One such stage is associated with the scan of a retail item having a barcode. While a successful barcode scan can be confirmed by contemporaneously obtaining a decoded barcode identifier, an unsuccessful barcode scan is more difficult to determine since the barcode scanner may not have scanned the barcode while the retail item was swiped over the scanner window or the retail item was transferred over the scan platform and the scanner window and placed in the bagging area without the barcode being properly scanned. Accordingly, there is a need for improved techniques to detect activities at point of sale such as an attempted barcode scan of a retail item at point of sale. In addition, other desirable features and characteristics of the present disclosure will become apparent from the subsequent detailed description and embodiments, taken in conjunction with the accompanying figures and the foregoing technical field and background.

In one exemplary embodiment, the optical sensor device (e.g., camera) disposed on or about the POS system can capture one or more successive images on or about a scan platform. The scan platform can be configured to include a scanner window through which an optical scanner device disposed below the scanner window can detect the barcode or QR code as a retail item is swiped over the scanner window. The barcode can be detected by the optical scanner device based on one or more successive images captured by the optical scanner device. Further, the optical sensor device can be positioned on or about the POS system so that the field of view of the optical sensor device is towards the scan platform. In one example, the optical sensor device is positioned above and towards the side of the scan platform. In another example, the optical sensor device is positioned above the scan platform. In yet another example, the optical sensor device is positioned on a ceiling surface above the POS system or at the end of an extension mechanism of the POS system (e.g., pole) that extends the optical sensor device above the POS system. In operation, the POS system can receive, from the optical sensor device, current and previous successive images associated with the scan platform. Further, the POS system can detect activity associated with an attempted scan of the retail item over the scanner window based on the current and previous successive images and a static image that represents an image of the scan platform captured by the optical sensor device when inactivity is detected.

In another exemplary embodiment, the POS system can capture successive images associated with a first spatial region of the POS system. In one example, the first spatial region is associated with certain consumer activity (e.g., retail item scan) specific to the POS system. In another example, the first spatial region is associated with a scan platform of the POS system. In yet another example, the first spatial region is associated with certain consumer activity related to a scan platform of the POS system. In yet another example, the first spatial region is associated with the movement of an object about the scan platform. Further, the first spatial region includes a second spatial region, with the second spatial region being disposed within the first spatial region. In one example, the second spatial region is associated with consumer activity related to an optical scanner device of the POS system. In another example, the second spatial region is associated with a scanner window of the POS system. In yet another example, the second spatial region is associated with a scan by an optical scanner device of a visual object identifier code (e.g., barcode, QR code) disposed on an object (e.g., retail item). In yet another example, the second spatial region is associated with a spatial region of the POS system in which an optical scanner device can scan a visual object identifier code disposed on an object through a scanner window of the POS system. In yet another example, the second spatial region is associated with the movement of an object about the scanner window. The POS system can then detect activity associated with an attempted scan of the retail item on or about the second spatial region based on successive images associated with the first spatial region and the static image associated with the first spatial region. The POS system can crop each successive image based on a perimeter of the first spatial region. Any false positive movement detections are reduced by cropping each successive image about the first spatial region instead of the second spatial region as the second spatial region may be blocked by a consumer (e.g., hand, arm, head) conducting activity at the POS system. The POS system can capture the static image when there is no activity detected in the second spatial region for a certain time period (e.g., 1 second, 2 seconds, 5 seconds, 10 seconds, 20 seconds, 30 seconds, 1 minute). Further, the POS system can conduct the capture of the static image based on a certain set of rules and video frame counting logic.

In another exemplary embodiment, preprocessing of each successive image associated with the first spatial region can be performed by blurring each successive image and averaging the absolute difference over a certain number of successive images so as to reduce image artifacts such as intermittent scanner lights produced by the optical scanner device.

In another exemplary embodiment, the POS system can determine a first image difference between the current and previous successive images and a second image difference between the current successive image and the static image. The second image difference is configured to detect those conditions where an object is left positioned in the second spatial region for a certain time period that is greater than the time to perform a scan of an object by the optical scanner device. For each image difference, the POS system can transform each pixel value to a binary value, sum the binary values, and then compare the summed binary values to a corresponding threshold, which may be empirically determined for each image difference. If the summed binary value for either image difference is at least the corresponding threshold, then activity (e.g., object placement or movement) is detected in the second spatial region. Otherwise, inactivity is detected in the second spatial region.

FIG. 1 illustrates one embodiment of a POS system 100 operable to perform activity detection at point of sale in accordance with various aspects as described herein. As shown in FIG. 1, the POS system 100 (e.g., checkout device, self-checkout device) can be communicatively coupled to a network node (e.g., server) over a network (e.g., Ethernet, WiFi, Internet). The POS system 100 can include a terminal station device 102 and a bagging station device 141. The terminal station device 102 has a housing 112, a scan platform 114 having a scanner window 115 through which an optical scanner device disposed in the POS system 100 can scan a visual object identifier code (e.g., barcode, QR code) disposed on an object (e.g., retail item) while on or about the scanner window 115, another optical scanner 116 (e.g., portable scanner), a display device 118 (e.g., touch-screen), a payment processing mechanism 122 (e.g., credit card transaction device), a printer 124, a coupon slot mechanism 125, a cash acceptor mechanism 126, a change (e.g., coins, cash) interface mechanism 128, the like, or any combination thereof. In addition, the terminal station device 102 can be configured to include a set of light emitting element (LED) devices 130a-e (collectively, LED devices 130). The housing 112 can be configured to include a cabinet that contains a processing circuit operable to control the operations and functions of the POS system 100. Each LED device 130a-e can be configured to be individually or collectively controlled by a processing circuit of the POS system 100 to indicate certain contextual information to a consumer or a retail store clerk. Although not explicitly shown herein, the housing 112 can also contain cabling and other functional components that communicatively couple the POS system 100 to a network (e.g., Ethernet, WiFi, Internet) or a network node (e.g., server) over the network or that communicatively couple the terminal station device 102 to the bagging station device 141. The network node may include, for example, one or more server devices that may or may not be co-located with the POS system 100 or in the retail store that includes the POS system 100.

In FIG. 1, each scanner device can be configured as an optical scanner device operable to scan a visual object identifier code 153 (e.g., barcode, QR code) disposed on an object 151 (e.g., retail item) that a consumer intends to purchase via the POS system 100. The scanner 116 can be configured as a hand-held, battery-operated scanner that a consumer or a clerk can remove from its battery charging dock to scan barcodes on retail items such as without having to remove them from a shopping cart. Each visual object identifier code 153 can represent one of a set of object identifiers (e.g., UPCs), with each identifier being specific to a certain object (e.g., retail item, trade item) and represented by a series of characters (e.g., numeric characters, alphabetic characters, alphanumeric characters). Universal Product Code (UPC), which can refer to UPC-A, consists of a sequence of twelve characters (e.g., 12 numeric characters) that are uniquely assigned to each object. Along with the related International Article Number (EAN) barcode, the UPC is the barcode mainly used for scanning retail items at the point of sale, per the specifications of the international GS1 organization. In one example, a UPC-A barcode consists of a sequence of twelve characters (e.g., 12 digits), which are made up of four sections: a number system character, a five-character manufacturing number, a five-character item number and a check character.

In FIG. 1, the scanner associated with the scanner window 115 can be operable to perform dual scanner and scale functions to allow the retail item to be contemporaneously scanned and weighed for purchase by a consumer. The scan platform 114 can be configured to place an object to be weighed by the scale function. The display 118 can be operable to display information associated with retail items being purchased by a consumer. The payment processing mechanism 122 can be configured with a pinpad device operable to accept a non-cash payment vehicle (e.g., credit card or debit card), while the printer 124 can be configured to print receipts or coupons. The coupon slot mechanism 125 can include a generally elongated slot configured to receive coupons being redeemed by a consumer. The cash acceptor mechanism 126 can be operable to receive cash (e.g., paper money, coins) from the consumer for the retail items being purchased by the consumer. The change interface mechanism 128 can be operable to provide change to the consumer in the form of paper money or coins. The terminal station device 102 can also include an optical sensor device 117 (e.g., camera) operable to capture an image of an object on or about the scan platform 114. While the optical sensor device 117 is shown in FIG. 1 spatially adjacent to the scan platform 114, in other embodiments, the optical sensor device can be disposed on a ceiling surface above the POS system, at the end of an extension mechanism of the POS system (e.g., pole) that extends the optical sensor device above the POS system, the like, or any combination thereof. The field of view of the optical sensor device 117 can be towards and include the scan platform 114.

In operation, the POS system 100 can obtain each successive image associated with a first spatial region associated with the scan platform 114. The first spatial region includes a second spatial region associated with the scanner window 115. The POS system 100 can receive, by a processing circuit of the POS system 100, from the optical sensor device 117, each successive image associated with the first spatial region. The POS system 100 can then apply pre-processing to each successive image. For instance, the POS system 100 can apply a first filter (e.g., blur filter, moving average filter) on each successive image to reduce image artifacts (e.g., intermittent scanner lights); convert color pixels of each successive image to grayscale pixels of that image; orient each successive image to have the same orientation as the first or second spatial region; crop each successive image based on a perimeter of the first or second spatial region; and/or reduce a resolution of each successive image. The POS system 100 can also enhance each successive image. For instance, the POS system 100 can apply a second filter (e.g., low pass filter) on each successive image to reduce noise and remove smaller details in that image; and/or normalize a range of the pixel values of each successive image.

In FIG. 1, the POS system 100 can determine a first image difference (e.g., sum of absolute differences, mean square error) based on current and previous successive images. Further, the POS system 100 can determine that the first image difference is at least a first activity threshold associated with an object being transferred through or placed in the first spatial region to obtain a first indication of activity detected in the first spatial region. Similarly, the POS system 100 can determine a second image difference based on the current successive image and a static image that represents an image of the first spatial region when inactivity is detected in the second spatial region. The POS system 100 can determine that the second image difference is at least a second activity threshold associated with a retail item remaining positioned in the second spatial region to obtain a second indication of activity detected in the second spatial region. Further, the first activity threshold is less than the second activity threshold. The POS system 100 can then determine that the second spatial region has activity (e.g., attempted object scan, object placed in second spatial region) based on the first and second activity detected indications. The POS system 100 can send an indication that activity is detected in the second spatial region.

In another exemplary embodiment, the POS system 100 can obtain a first indication associated with a time in which the scan of the visual object identifier code 153 of the object 151 while in or about the second spatial region occurred. Further, the POS system 100 can obtain a second indication associated with a time in which the detected activity in or about the second spatial region occurred. The POS system 100 can determine that the detected activity time is contemporaneous with the scan time. For instance, the POS system 100 can determine that the time difference between the detected activity time and the scan time is no more than a predetermined time threshold (e.g., 100 microseconds, 500 microseconds, 1 second, 2 seconds) associated with a time period to perform a scan of the visual object identifier code 153 of the object 151 over the scanner window 115. As such, the POS system 100 can determine that the detected activity in or about the second spatial region corresponds to the scan of the visual object identifier code of the object while in or about the second spatial region. The POS system 100 can then send an indication that the detected activity in or about the second spatial region 115 corresponds to the scan of the visual object identifier code in or about the second spatial region 115.

In another exemplary embodiment, the POS system 100 can determine that the first image difference is less than a first inactivity threshold for each successive image obtained during a first time period (e.g., 1 second, 2 second, 5 seconds, 10 seconds). Further, the first inactivity threshold is less than the first activity threshold. The POS system 100 can then assign one of the successive images (e.g., current or previous successive image) obtained during the first time period as the static image.

In another exemplary embodiment, the POS system 100 can determine that the first image difference is less than a second inactivity threshold for each successive image obtained during a second time period (e.g., 2 seconds, 5 seconds, 10 seconds, 20 seconds). Further, the second inactivity threshold is less than the first inactivity threshold and the second time period is longer than the first time period. The POS system 100 can determine that the second image difference of the current successive frame at the end of the second time period is less than a third inactivity threshold. The third inactivity threshold is greater than the first and second inactivity thresholds but less than the second activity threshold. The POS system 100 can then assign one of the successive images (e.g., current or previous successive image) obtained during the second time period as the static frame.

In another exemplary embodiment, the POS system 100 can determine that the first image difference is less than a fourth inactivity threshold for each successive image obtained during a third time period (e.g., 5 seconds, 10 seconds, 20 seconds, 30 seconds, 1 minute, 5 minutes). Further, the fourth inactivity threshold is less than each of the first, second and third inactivity thresholds and the third time period is greater than each of the first and second time periods. The POS system 100 can then assign one of the successive images (e.g., current or previous successive image) obtained during the third time period as the static image.

Figure 2A:
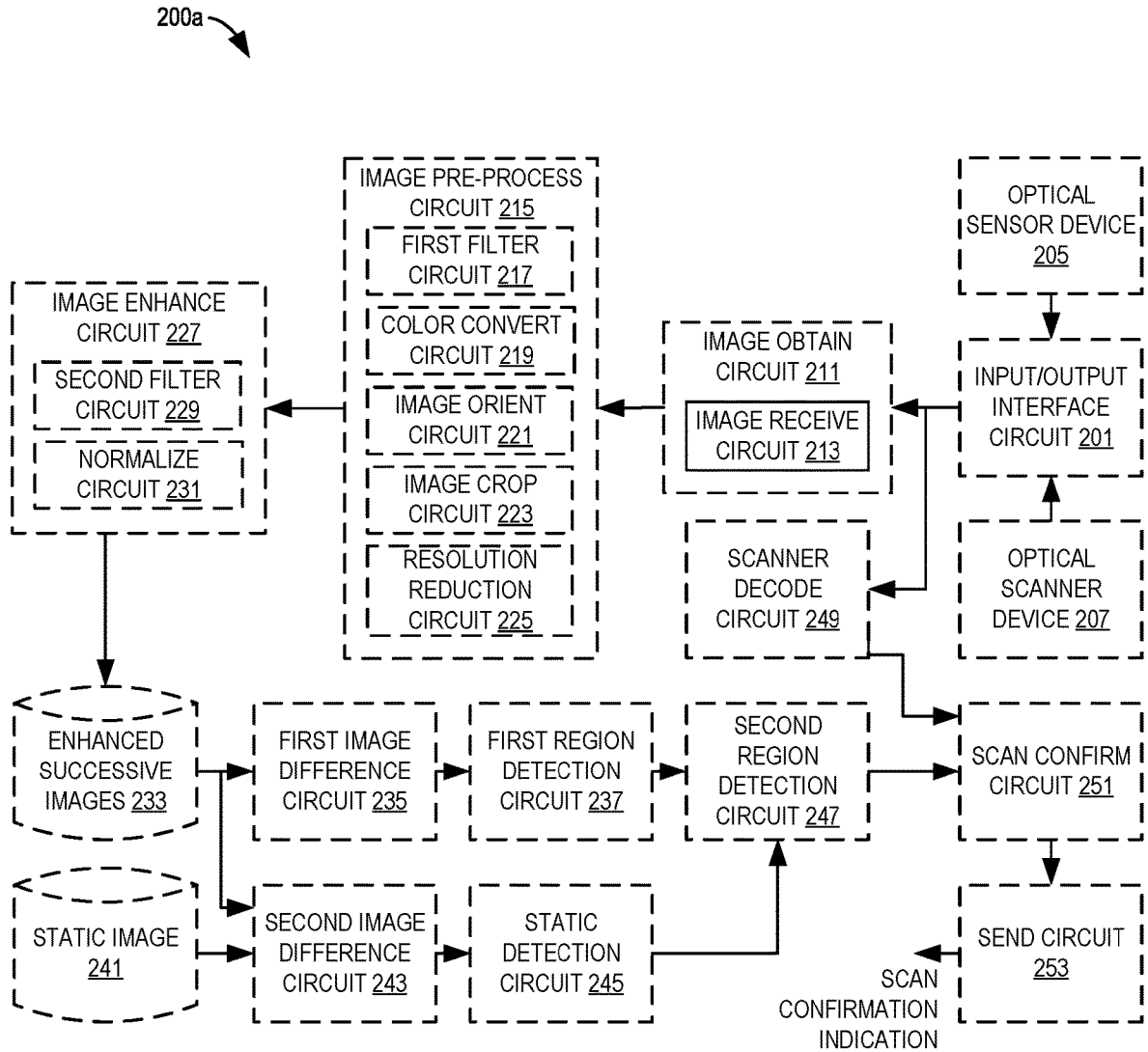
FIGS. 2A-2B illustrate other embodiments of a POS system in accordance with various aspects as described herein.

FIG. 2A illustrates another embodiment of a POS system/device 200a in accordance with various aspects as described herein. In FIG. 2A, the device 200a implements various functional means, units, or modules (e.g., via the processing circuitry 301 in FIG. 3, via the processing circuitry 501 in FIG. 5, via software code, or the like), or circuits. In one embodiment, these functional means, units, modules, or circuits (e.g., for implementing the method(s) described herein) may include for instance: an input/output interface circuit 201 operable to interface with input and output devices such as to an optical sensor device 205 (e.g., camera) and an optical scanner device 207 (e.g., camera, scanner); an image obtain circuit 211 operable to obtain a successive image such as from the optical sensor device 205 or the optical scanner device 207; an image receive circuit 213 operable to receive, from the optical sensor device 205 or the optical scanner device 207, an image; an image pre-process circuit 215 operable to pre-process an image; a first filter circuit 217 operable to apply a first filter to an image such as to reduce artifacts or noise of that image; a color convert circuit 219 operable to convert color pixels of an image to grayscale pixels; an image orient circuit 221 operable to orient an image; an image crop circuit 223 operable to crop an image; a resolution reduction circuit 225 operable to reduce the resolution of an image; an image enhance circuit 227 operable to enhance one or more characteristics of an image to obtain an enhanced image 233; a second filter circuit 229 operable to apply a second filter to an image such as to reduce noise or detail of an image; a normalize circuit 231 to normalize (e.g., change a range of pixel intensity values) a range of pixel values of each pixel of an image; a first image difference circuit 235 operable to determine a difference between current and previous successive images; a first spatial region detection circuit 237 operable to detect activity in the first spatial region of the POS system 200a; a second image difference circuit 243 operable to determine a difference between a current image and a static image; a static detection circuit 245 operable to detect activity based on the second image difference; a second spatial region detection circuit 247 operable to detect activity in the second spatial region of the POS system 200a; a scanner decode circuit 249 operable to decode a visual object identifier code disposed on an object during a scan of that object via the optical scanner device 207; a scan/activity confirmation circuit 251 operable to confirm that the detected activity in the second spatial region corresponds to a scan of a visual object identifier code of an object while in the second spatial region; and/or a send circuit 253 operable to send information.

Figure 2B:
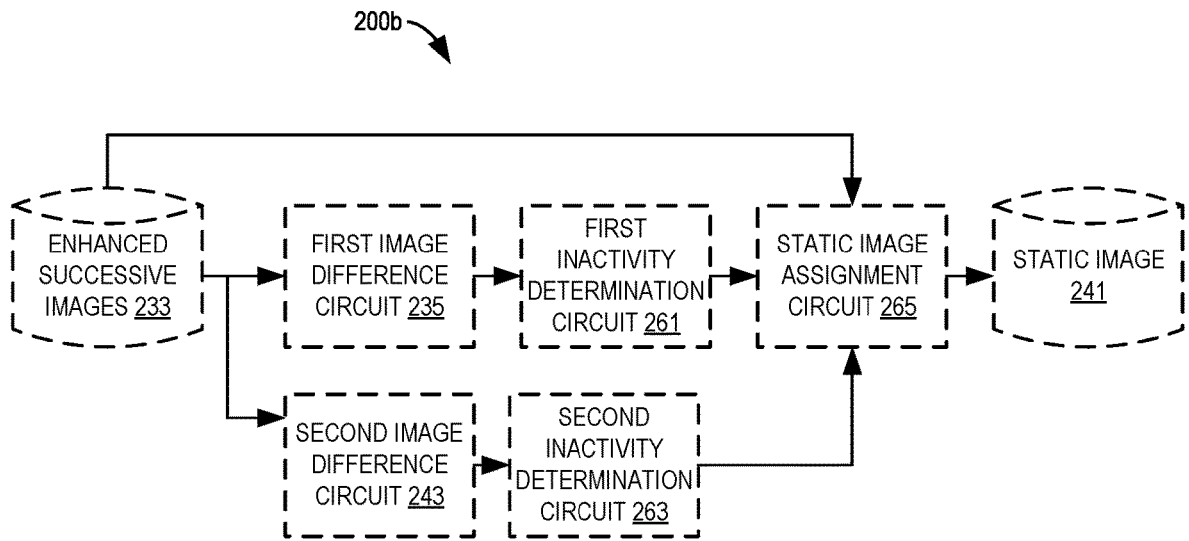

FIG. 2B illustrates another embodiment of a POS system/device 200b in accordance with various aspects as described herein. In FIG. 2B, the device 200b implements various functional means, units, or modules (e.g., via the processing circuitry 301 in FIG. 3, via the processing circuitry 501 in FIG. 5, via software code, or the like), or circuits. In one embodiment, these functional means, units, modules, or circuits (e.g., for implementing the method(s) described herein) may include for instance: the first image difference circuit 235 operable to determine a difference between current and previous enhanced successive images 233; a first inactivity determination circuit 261 operable to determine that the first image difference is less than a certain inactivity threshold; a second image difference circuit 243 operable to determine a difference between a current enhanced successive image 233 and the static image 241; a second inactivity determination circuit 263 operable to determine that the second image difference is less than a certain inactivity threshold; and/or a static image assignment circuit 265 operable to assign an enhanced successive image 233 as the static image 241.

Figure 2C:
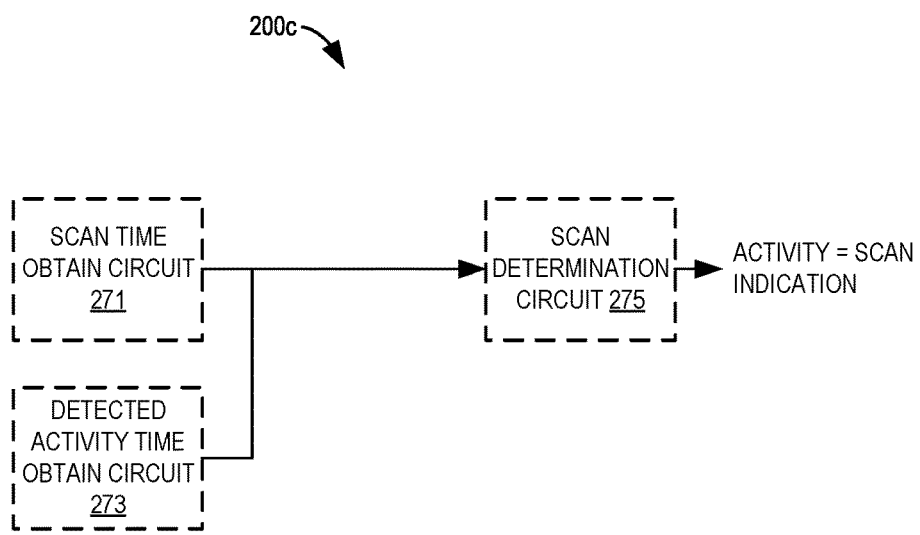

FIG. 2C illustrates another embodiment of a POS system/device 200c in accordance with various aspects as described herein. In FIG. 2C, the device 200c implements various functional means, units, or modules (e.g., via the processing circuitry 301 in FIG. 3, via the processing circuitry 501 in FIG. 5, via software code, or the like), or circuits. In one embodiment, these functional means, units, modules, or circuits (e.g., for implementing the method(s) described herein) may include for instance: a scan time obtain circuit 271 operable to obtain a first indication associated with a time in which the scan of the visual object identifier code of the object while in the second spatial region occurred; an activity time obtain circuit 273 operable to obtain a second indication associated with a time in which the detected activity in the second spatial region occurred; and/or a scan determination circuit 275 operable to determine that the detected activity in the second spatial region is contemporaneous with the scan of the visual object identifier code of the object while in the second spatial region based on the first and second time indications.

Figure 3:
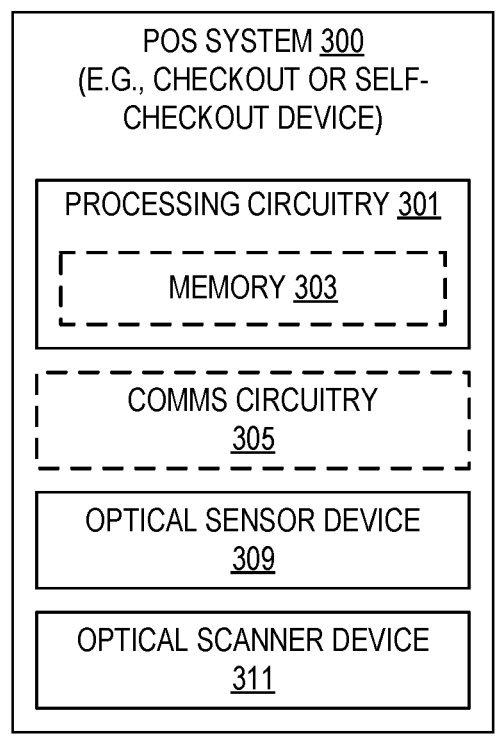
FIG. 3 illustrates another embodiment of a POS system in accordance with various aspects as described herein.

FIG. 3 illustrates another embodiment of a POS system 300 in accordance with various aspects as described herein. In FIG. 3, the device 300 may include processing circuitry 301 that is operably coupled to one or more of the following: memory 303, network communications circuitry 305, an optical sensor device 309 (e.g., camera), an optical scanner device 311 (e.g., scanner), the like, or any combination thereof. The network communication circuitry 305 is configured to transmit or receive information to or from one or more other devices via any communication technology. The processing circuitry 301 is configured to perform processing described herein, such as by executing instructions stored in memory 303. The processing circuitry 301 in this regard may implement certain functional means, units, or modules.

Figure 4A:
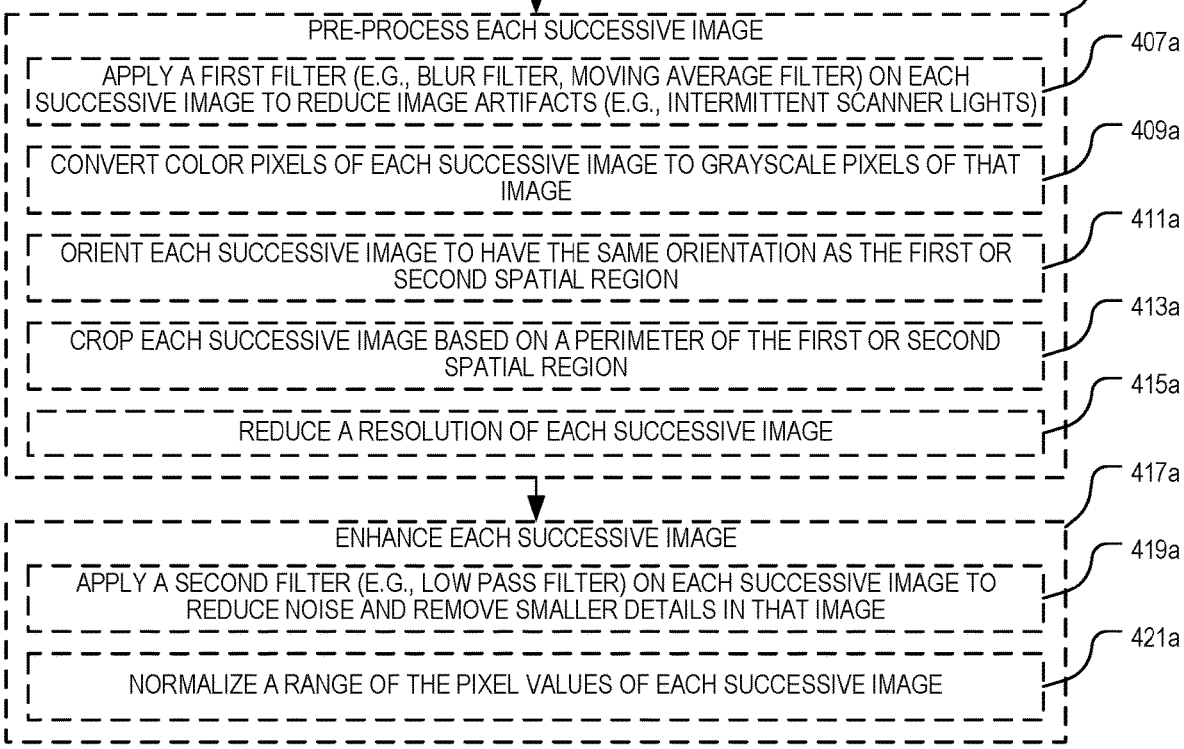
FIG. 4A-F illustrate embodiments of a method performed by a POS system of activity detection at point of sale in accordance with various aspects as described herein.

FIG. 4A illustrates one embodiment of a method 400a performed by a POS system 100, 200a-c, 300, 500 of activity detection at point of sale in accordance with various aspects as described herein. In FIG. 4A, the method 400a may start, for instance, at block 401a where it includes obtaining each successive image associated with the first spatial region. For instance, at block 403a, the method 400a may include receiving, by a processing circuit of the POS system 100, 200a-c, 300, 500, from the optical sensor device, a set of successive images associated with the first spatial region to enable detection of activity in the second spatial region. In block 405a, the method 400a may include pre-processing each successive image. For instance, the method 400a may include applying a first filter (e.g., blur filter, moving average filter) on each successive image to reduce image artifacts (e.g., intermittent scanner lights), as referenced at block 407a. Further, at block 409a, the method 400a may include converting color pixels of each successive image to grayscale pixels of that image. The method 400a may also include orienting each successive image to have the same orientation as the second spatial region of the POS system 100, 200a-c, 300, 500, as represented at block 411a. At block 413a, the method 400a may include cropping each successive image based on a perimeter of the second spatial region. In addition, at block 415a, the method 400a may include reducing a resolution of each successive image. The method 400a may include enhancing each successive image, as represented at block 417a. For instance, at block 419a, the method 400a may include applying a second filter (e.g., low pass filter) on each successive image to reduce noise and remove smaller details in that image. Further, the method 400a may include normalizing a range of the pixel values of each successive image, as represented by block 421a.

Figure 4B:
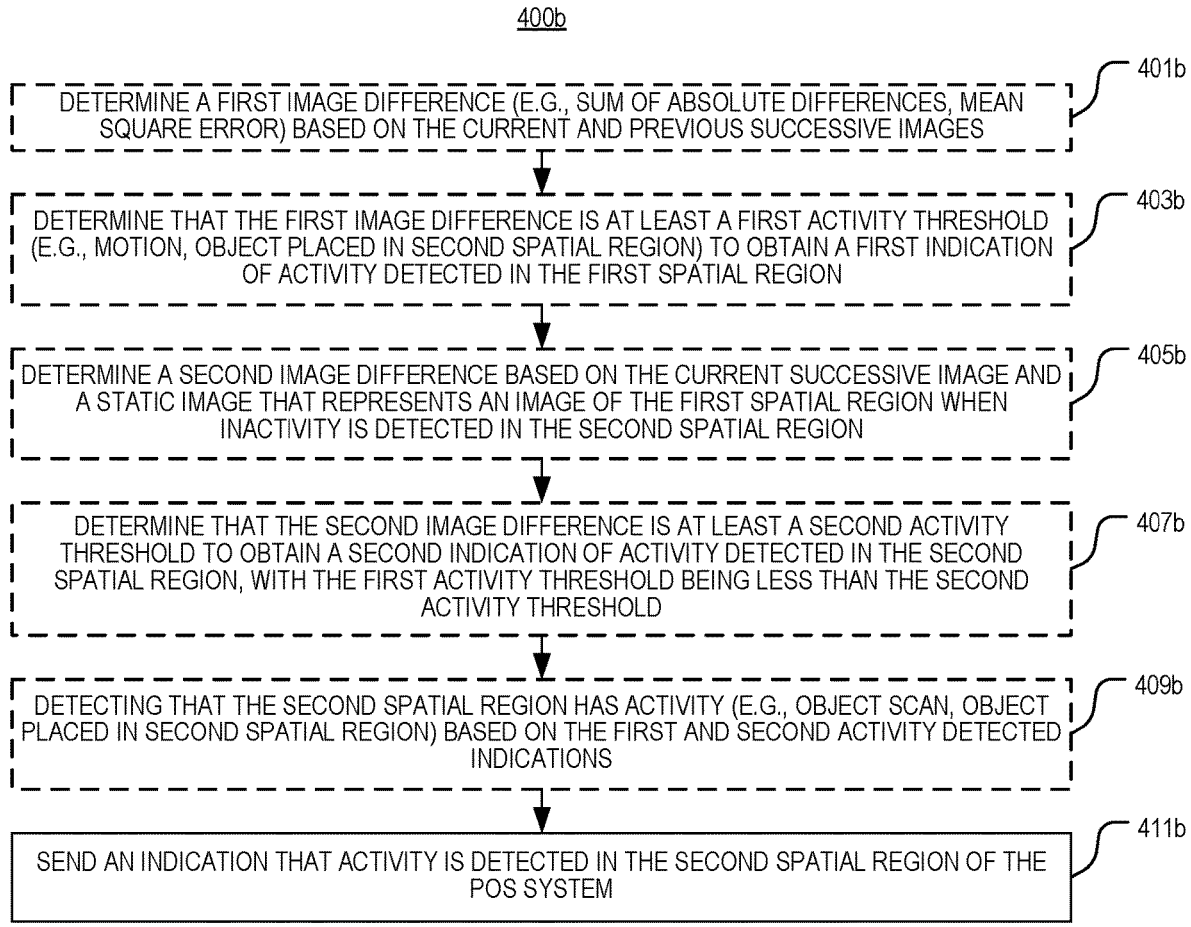

FIG. 4B illustrates another embodiment of a method 400b performed by a POS system 100, 200a-c, 300, 500 of activity detection at point of sale in accordance with various aspects as described herein. In FIG. 4B, the method 400b may start, for instance, at block 401b where it may include determining a first image difference (e.g., sum of absolute differences, mean square error) based on the current and previous successive images. At block 403b, the method 400b may include determining that the first image difference is at least a first activity threshold (e.g., motion, object placed in second spatial region) to obtain a first indication of activity detected in the first spatial region of the POS system 100, 200a-c, 300, 500. At block 405b, the method 400b includes determining a second image difference based on the current successive image and a static image that represents an image of the second spatial region of the POS system 100, 200a-c, 300, 500 when inactivity is detected. The method 400b may include determining that the second image difference is at least a second activity threshold to obtain a second indication of activity detected in the second spatial region, with the first activity threshold being less than the second activity threshold, as represented at block 407b. At block 409b, the method 400b may include determining that the second spatial region has activity (e.g., object scan, object placed in second spatial region) based on the first and second indications of activity detected in the second spatial region. At block 411b, the method 400b includes sending an indication that activity is detected in the second spatial region.

Figure 4C:
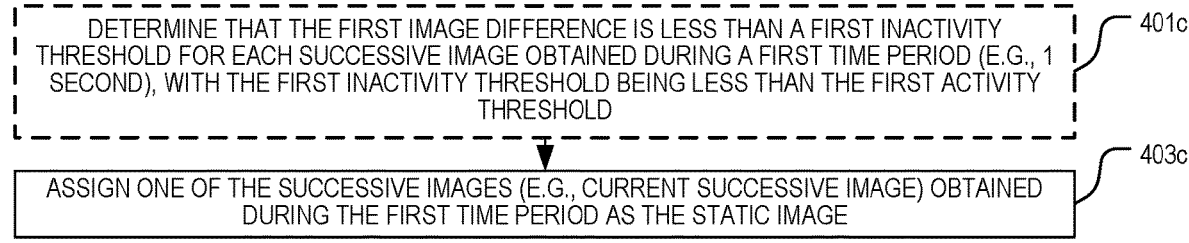

FIG. 4C illustrates another embodiment of a method 400c performed by a POS system 100, 200a-c, 300, 500 of activity detection at point of sale in accordance with various aspects as described herein. In FIG. 4C, the method 400c may start, for instance, at block 401c where it may include determining that the first image difference is less than a first inactivity threshold for each successive image obtained during a first time period (e.g., 1 second), with the first inactivity threshold being less than the first activity threshold. At block 403c, the method 400c includes assigning one of the successive images (e.g., current successive image) obtained during the first time period as the static image.

Figure 4D:
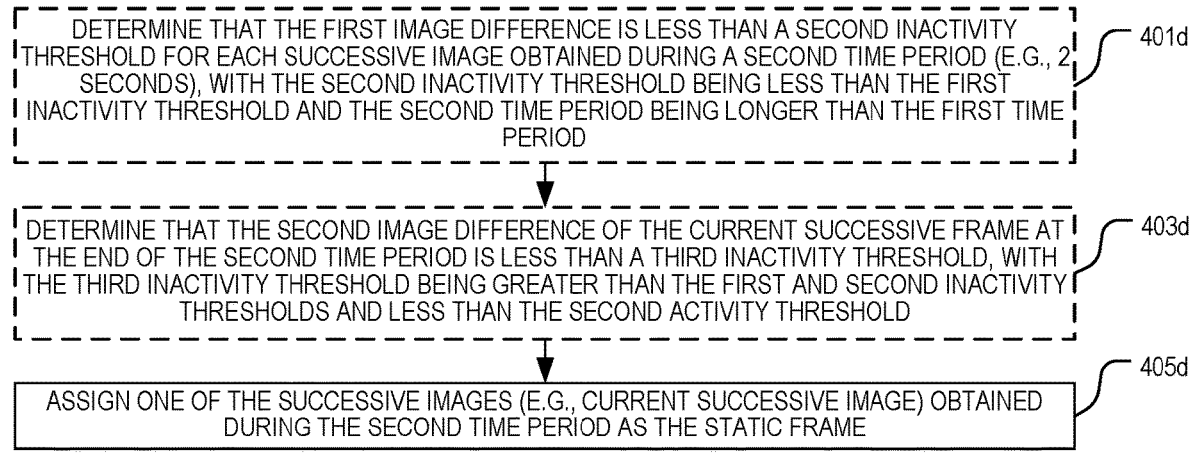

FIG. 4D illustrates another embodiment of a method 400d performed by a POS system 100, 200a-c, 300, 500 of activity detection at point of sale in accordance with various aspects as described herein. In FIG. 4D, the method 400d may start, for instance, at block 401d where it may include determining that the first image difference is less than a second inactivity threshold for each successive image obtained during a second time period (e.g., 2 seconds), with the second inactivity threshold being less than the first inactivity threshold and the second time period being longer than the first time period. At block 403d, the method 400d may include determining that the second image difference of the current successive frame at the end of the second time period is less than a third inactivity threshold, with the third inactivity threshold being greater than the first and second inactivity thresholds and less than the second activity threshold. The method 400d includes assigning one of the successive images (e.g., current successive image) obtained during the second time period as the static frame, as represented at block 405d.

Figure 4E:
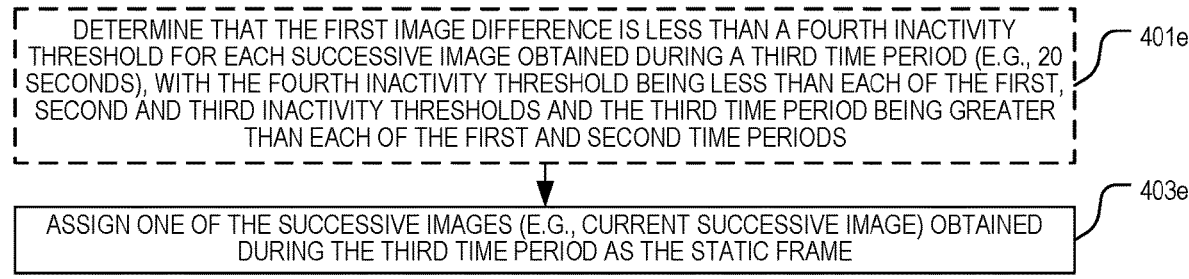

FIG. 4E illustrates another embodiment of a method 400e performed by a POS system 100, 200a-c, 300, 500 of activity detection at point of sale in accordance with various aspects as described herein. In FIG. 4E, the method 400e may start, for instance, at block 401e where it may include determining that the first image difference is less than a fourth inactivity threshold for each successive image obtained during a third time period (e.g., 20 seconds), with the fourth inactivity threshold being less than each of the first, second and third inactivity thresholds and the third time period being greater than each of the first and second time periods. At block 403e, the method 400e includes assigning one of the successive images (e.g., current successive image) obtained during the third time period as the static frame.

Figure 4F:
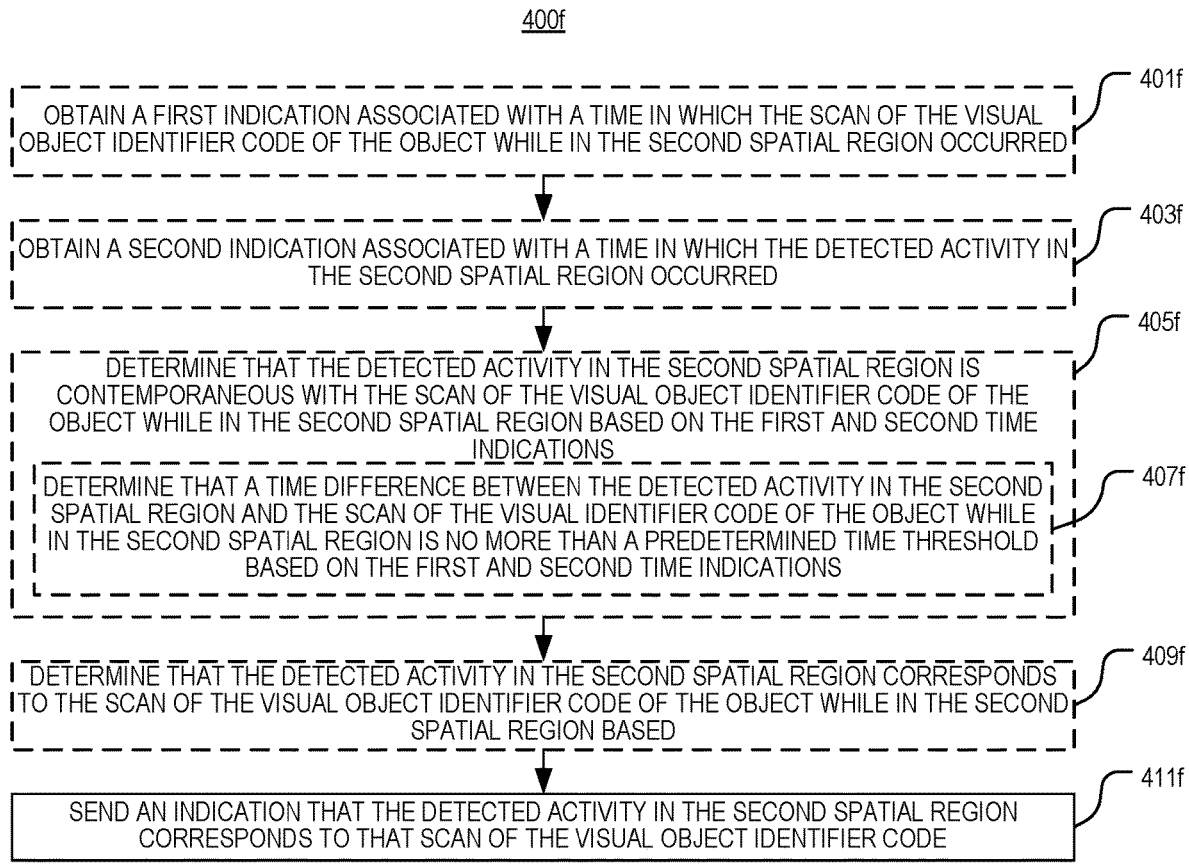

FIG. 4F illustrates another embodiment of a method 400f performed by a POS system 100, 200a-c, 300, 500 of activity detection at point of sale in accordance with various aspects as described herein. In FIG. 4F, the method 400f may start, for instance, at block 401f where it may include obtaining a first indication associated with a time in which the scan of the visual object identifier code of the object while in the second spatial region occurred. At block 403d, the method 400d may include obtaining a second indication associated with a time in which the detected activity in the second spatial region occurred. The method 400f may include determining that the detected activity in the second spatial region is contemporaneous with the scan of the visual object identifier code of the object while in the second spatial region based on the first and second time indications, as represented at block 405d. For instance, the method 400f may include determining that a time difference between the detected activity in the second region and the scan of the visual identifier code of the object while in the second spatial region is no more than a predetermined time threshold based on the first and second time indications, as represented at block 407f. At block 409f, the method 400f may include determining that the detected activity in the second spatial region corresponds to the scan of the visual object identifier code of the object while in the second spatial region based. At block 411f, the method 400f includes sending an indication that the detected activity in the second spatial region corresponds to that scan of the visual object identifier code.

Figure 5:
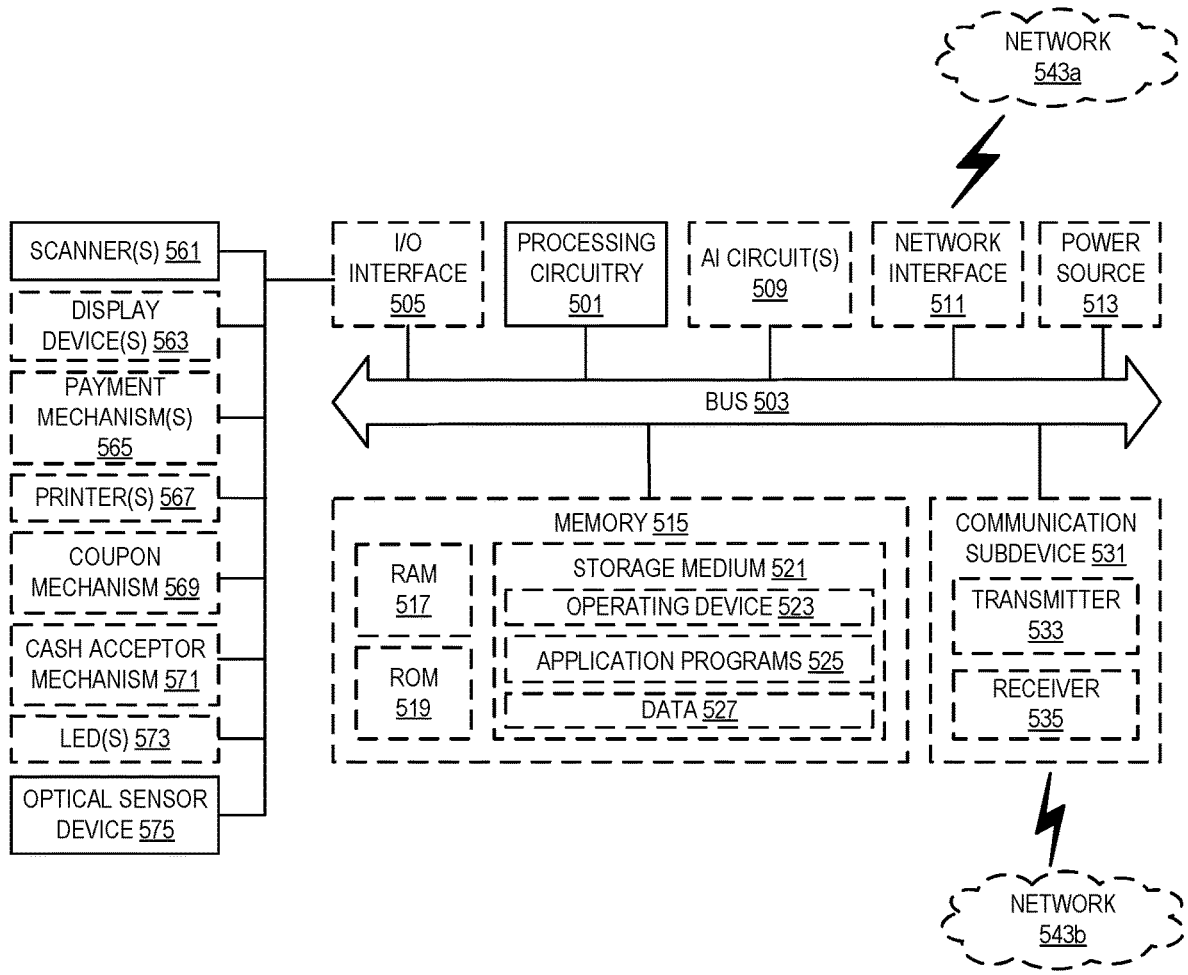
FIG. 5 illustrates another embodiment of a POS system in accordance with various aspects as described herein.

FIG. 5 illustrates another embodiment of a POS system/device 500 in accordance with various aspects as described herein. In FIG. 5, device 500 includes processing circuitry 501 that is operatively coupled over bus 503 to input/output interface 505, artificial intelligence circuitry 509 (e.g., neural network circuit, machine learning circuit), network connection interface 511, power source 513, memory 515 including random access memory (RAM) 517, read-only memory (ROM) 519 and storage medium 521, communication subsystem 531, and/or any other component, or any combination thereof.

The input/output interface 505 may be configured to provide a communication interface to an input device, output device, or input and output device. The device 500 may be configured to use an output device via input/output interface 505. An output device 561 may use the same type of interface port as an input device. For example, a USB port or a Bluetooth port may be used to provide input to and output from the device 500. The output device may be a speaker, a sound card, a video card, a display, a monitor, a printer, an actuator, a transducer 575 (e.g., speaker, ultrasound emitter), an emitter, a smartcard, another output device, or any combination thereof. The device 500 may be configured to use an input device via input/output interface 505 to allow a user to capture information into the device 500. The input device may include a scanner device 561 (e.g., optical scanner device), a touch-sensitive or presence-sensitive display 563, an optical sensor device 575 (e.g., camera), a load sensor (e.g., weight sensor), a microphone, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical or image sensor, an infrared sensor, a proximity sensor, a microphone, an ultrasound sensor, another like sensor, or any combination thereof. As shown in FIG. 500, the input/output interface 505 can be configured to provide a communication interface to components of the POS system 100 such as the scanner associated with the scanner window 115, the scanner 116, a scale associated with the scan platform 114, the display device 118, touchscreen 118, the payment processing mechanism 122, the printer 124, the coupon slot mechanism 125, the cash acceptor mechanism 126, light emitting devices 130, keyboard, keypad, card reader, the like, or any combination thereof.

In FIG. 5, storage medium 521 may include operating system 523, application program 525, data 527, the like, or any combination thereof. In other embodiments, storage medium 521 may include other similar types of information. Certain devices may utilize all of the components shown in FIG. 5, or only a subset of the components. The level of integration between the components may vary from one device to another device. Further, certain devices may contain multiple instances of a component, such as multiple processors, memories, neural networks, network connection interfaces, transceivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In FIG. 5, the artificial intelligence circuitry 509 may be configured to learn to perform tasks by considering examples such as performing activity detection, classification or identification based on one or more successive images. In one example, first artificial intelligence circuitry is configured to perform activity detection or classification. Further, second artificial intelligence circuitry is configured to perform activity identification. In FIG. 5, the network connection interface 511 may be configured to provide a communication interface to network 543a. The network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as web browser, web application, user interface, browser data manager as described herein, a widget or gadget engine, or another application, and a data file 527. The storage medium 521 may store, for use by the device 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500a-b to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

The processing circuitry 501 may be configured to communicate with network 543b using the communication subsystem 531. The network 543a and the network 543b may be the same network or networks or different network or networks. The communication subsystem 531 may be configured to include one or more transceivers used to communicate with the network 543b. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software, or firmware, or alternatively may be implemented separately.

In FIG. 5, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543b may encompass wired and/or wireless networks such as a local-area network (LAN), a wide-area network (WAN), a computer network, a wireless network, a telecommunications network, another like network or any combination thereof. For example, the network 543b may be a cellular network, a Wi-Fi network, and/or a near-field network. The power source 513 may be configured to provide alternating current (AC) or direct current (DC) power to components of the device 500a-b.

The features, benefits and/or functions described herein may be implemented in one of the components of the device 500 or partitioned across multiple components of the device 500. Further, the features, benefits, and/or functions described herein may be implemented in any combination of hardware, software, or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one exemplary embodiment, a method is performed by a POS system having first and optical scanner devices. The optical sensor device is positioned on or about the POS system with a field of view directed towards a first spatial region of the POS system and operable to capture successive images. The optical scanner device is positioned on or about the POS system with a field of view directed towards a second spatial region disposed within the first spatial region and associated with scanning visual object identifier codes disposed on objects and operable to scan those visual object identifier codes. The method includes receiving, from the optical sensor device, a set of successive images associated with the first spatial region to enable detection of activity in or about the second spatial region so as to confirm that detected activity in the second spatial region corresponds to a scan of a visual object identifier code of an object while in or about the second spatial region.

In another exemplary embodiment, the method further includes filtering, by a first filter circuit, each successive image so as to reduce a display of an intermittent light beam captured on at least one successive image. Further, the intermittent light beam is associated with the scan of the visual object identifier code of the object while in the second spatial region.

In another exemplary embodiment, the method further includes reducing an amount of image data representing each successive image so as to reduce a computational complexity associated with processing that image.

In another exemplary embodiment, the reducing step further includes converting the set of pixels of each successive image from a color pixel to a grayscale pixel, or reducing a resolution of each successive image.

In another exemplary embodiment, the reducing step further includes orienting each successive image based on the second spatial region displayed on that image or cropping each successive image based on a perimeter of the second spatial region.

In another exemplary embodiment, the method further includes enhancing each successive image so as to improve detection of activity in the second spatial region.

In another exemplary embodiment, the enhancing step further includes filtering, by a second filter circuit, each successive image to reduce noise in that image, or reducing a range of pixel values of each of a set of pixels of each successive image.

In another exemplary embodiment, the method further includes detecting activity in the second spatial region based on current and previous successive images of the set of successive images and a static image that represents an image of the first spatial region when inactivity is detected in the second spatial region.

In another exemplary embodiment, the method further includes determining a first image difference based on the current and previous successive images; determining that the first image difference is at least a first activity threshold to obtain a first indication of activity detected in the first spatial region; determining a second image difference based on the current successive image and the static image; and determining that the second image difference is at least a second activity threshold to obtain a second indication of activity detected in the second spatial region. Further, the first activity threshold is less than the second activity threshold. The detecting step is also based on the first and second indications of activity detected in the second spatial region.

In another exemplary embodiment, the method further includes determining a first image difference based on the current and previous successive images; determining that the first image difference is less than a first inactivity threshold for each successive image obtained during a first time period; and assigning one of the successive images obtained during the first time period as the static image.

In another exemplary embodiment, the method further includes determining that the first image difference is less than a second inactivity threshold for each successive image obtained during a second time period. The method further includes determining a second image difference based on the current successive image and the static image; determining that the second image difference of the current successive frame at the end of the second time period is less than a third inactivity threshold; and assigning one of the successive images obtained during the second time period as the static frame. Further, the second inactivity threshold is less than the first inactivity threshold and the third inactivity threshold is greater than the first and second inactivity thresholds.

In another exemplary embodiment, the method further includes determining that the first image difference is less than a fourth inactivity threshold for each successive image obtained during a third time period; and assigning one of the successive images obtained during the third time period as the static frame. Further, the fourth inactivity threshold is less than each of the first, second and third inactivity thresholds and the third time period is greater than each of the first and second time periods.

In another exemplary embodiment, the method further includes determining that the detected activity in the second spatial region corresponds to the scan of the visual object identifier code of the object while in the second spatial region responsive to determining that the detected activity in the second spatial region is contemporaneous with the scan of the visual object identifier code of the object while in the second spatial region.

In another exemplary embodiment, the method further includes obtaining a first timestamp associated with the scan of the visual object identifier code of the object while in the second spatial region; and obtaining a second timestamp associated with the detected activity in the second spatial region. Further, the determining that the detected activity in the second spatial region is contemporaneous with the scan of the visual object identifier code of the object while in the second spatial region is based on the first and second timestamp.

In one exemplary embodiment, a POS system includes first and optical scanner devices. The optical sensor device is positioned on or about the POS system with a field of view directed towards a first spatial region of the POS system and operable to capture successive images. Further, the optical scanner device is positioned on or about the POS system with a field of view directed towards a second spatial region disposed within the first spatial region and associated with scanning visual object identifier codes disposed on objects and operable to scan those visual object identifier codes. The POS system further includes a memory having instructions executable by the processing circuitry whereby the processing circuitry is configured to receive, from the optical sensor device, a set of successive images associated with the first spatial region to enable detection of activity in or about the second spatial region so as to confirm that detected activity in the second spatial region corresponds to a scan of a visual object identifier code of an object while in or about the second spatial region.

In another exemplary embodiment, the memory includes further instructions executable by the processing circuitry whereby the processing circuitry is configured to detect activity in the second spatial region based on current and previous successive images of the set of successive images and a static image that represents an image of the first spatial region when inactivity is detected in the second spatial region.

In another exemplary embodiment, the memory includes further instructions executable by the processing circuitry whereby the processing circuitry is configured to determine a first image difference based on the current and previous successive images; determine that the first image difference is at least a first activity threshold to obtain a first indication of activity detected in the first spatial region; determine a second image difference based on the current successive image and the static image; determine that the second image difference is at least a second activity threshold to obtain a second indication of activity detected in the second spatial region; and detect activity in the second spatial region based on the first and second indications of activity detected in the second spatial region. Further, the first activity threshold is less than the second activity threshold.

In another exemplary embodiment, the memory includes further instructions executable by the processing circuitry whereby the processing circuitry is configured to determine a first image difference based on the current and previous successive images; determine that the first image difference is less than a first inactivity threshold for each successive image obtained during a first time period; and assign one of the successive images obtained during the first time period as the static image.

In another exemplary embodiment, the memory includes further instructions executable by the processing circuitry whereby the processing circuitry is configured to determine that the first image difference is less than a second inactivity threshold for each successive image obtained during a second time period; determine a second image difference based on the current successive image and the static image; determine that the second image difference of the current successive frame at the end of the second time period is less than a third inactivity threshold; and assign one of the successive images obtained during the second time period as the static frame. Further, the second inactivity threshold is less than the first inactivity threshold, and the third inactivity threshold is greater than the first and second inactivity thresholds; and In another exemplary embodiment, the memory includes further instructions executable by the processing circuitry whereby the processing circuitry is configured to determine that the detected activity in the second spatial region corresponds to the scan of the visual object identifier code of the object while in the second spatial region responsive to determining that the detected activity in the second spatial region is contemporaneous with the scan of the visual object identifier code of the object while in the second spatial region.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein.

Alternatively or additionally, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:
   by a point of sale (POS) system having an optical sensor device and an optical scanner device, with the optical sensor device being operable to capture successive images and having a field of view directed towards a first spatial region that includes a second spatial region associated with a scan by the optical scanner device of a visual object identifier code disposed on an object,
   receiving, from the optical sensor device, a set of successive images associated with the first spatial region to enable detection of activity in the second spatial region;
   determining a first image difference based on current and previous successive images of the set of successive images;
   determining that the first image difference is less than a first inactivity threshold for each successive image obtained during a first time period;
   assigning one of the successive images obtained during the first time period as a static image representing the first spatial region during a time in which inactivity is detected in the second spatial region;
   detecting activity in the first or second spatial region based on the current and previous successive images and the static image; and
   determining that the detected activity corresponds to a scan, performed in or about the second spatial region, of a visual object identifier code disposed on an object.

2. The method of claim 1, further comprising:
   filtering, by a first filter circuit, each successive image so as to reduce a display of an intermittent light beam and captured on at least one successive image, with the intermittent light beam being associated with the scan by the optical scanner device of the visual object identifier code of the object while in the second spatial region.

3. The method of claim 1, further comprising:
   reducing an amount of image data representing each successive image so as to reduce a computational complexity associated with processing that image.

4. The method of claim 3, wherein the reducing step further includes:
   converting the set of pixels of each successive image from a color pixel to a grayscale pixel; and
   reducing a resolution of each successive image.

5. The method of claim 3, wherein the reducing step further includes:
   orienting each successive image based on the first or second spatial region displayed on that image; and
   cropping each successive image based on a perimeter of the first or second spatial region.

6. The method of claim 1, further comprising:
   enhancing each successive image so as to improve detection of activity in the second spatial region.

7. The method of claim 6, wherein the enhancing step further includes:
   filtering, by a second filter circuit, each successive image to reduce noise in that image; and
   normalizing a range of pixel values of each of a set of pixels of each successive image.

8. The method of claim 1, further comprising:
   determining that the first image difference is at least the first activity threshold to obtain a first indication of activity detected in the first spatial region;
   determining a second image difference based on the current successive image and the static image;
   determining that the second image difference is at least a second activity threshold to obtain a second indication of activity detected in the second spatial region, with the first activity threshold being less than the second activity threshold; and wherein the detecting step is based on the first indication of activity detected in the first spatial region and the second indication of activity detected in the second spatial region.

9. The method of claim 1, further comprising:
determining that the first image difference is less than a second inactivity threshold for each successive image obtained during a second time period, with the second inactivity threshold being less than the first inactivity threshold;
determining a second image difference based on the current successive image and the static image;
determining that the second image difference of the current successive frame obtained during the second time period is less than a third inactivity threshold, with the third inactivity threshold being greater than the first and second inactivity thresholds; and
assigning one of the successive images obtained during the second time period as the static image.

10. The method of claim 9, further comprising:
determining that the first image difference is less than a fourth inactivity threshold for each successive image obtained during a third time period, with the fourth inactivity threshold being less than each of the first, second and third inactivity thresholds and the third time period being greater than each of the first and second time periods; and
assigning one of the successive images obtained during the third time period as the static image.

11. The method of claim 1, further comprising:
determining that the detected activity in the second spatial region corresponds to the scan of the visual object identifier code of the object while in the second spatial region responsive to determining that the detected activity in the second spatial region is contemporaneous with the scan of the visual object identifier code of the object while in the second spatial region.

12. The method of claim 11, further comprising:
obtaining a first indication associated with a time in which the scan of the visual object identifier code of the object while in the second spatial region occurred;
obtaining a second indication associated with a time in which the detected activity in the second spatial region occurred; and
wherein the determining that the detected activity in the second spatial region is contemporaneous with the scan of the visual object identifier code of the object while in the second spatial region is based on the first and second time indications.

13. A point of service (POS) system, comprising:
with the POS system having an optical sensor device and an optical scanner device, with the optical sensor device being operable to capture successive images and having a field of view directed towards a first spatial region that includes a second spatial region associated with a scan by the optical scanner device of a visual object identifier code disposed on an object,
wherein the POS system further includes a memory, the memory containing instructions executable by the processing circuitry whereby the processing circuitry is configured to:
receive, from the optical sensor device, a set of successive images associated with the first spatial region to enable detection of activity in the second spatial region;
determine a first image difference based on current and previous successive images of the set of successive images;
determine that the first image difference is less than a first inactivity threshold for each successive image obtained during a first time period;
assign one of the successive images obtained during the first time period as a static image representing the first spatial region during a time in which inactivity is detected in the second spatial region;
detect activity in the first or second spatial region based on the current and previous successive images and the static image; and
determine that the detected activity corresponds to a scan, performed in or about the second spatial region, of a visual object identifier code disposed on an object.

14. The POS system of claim 13, wherein the memory includes further instructions executable by the processing circuitry whereby the processing circuitry is configured to:
determine that the first image difference is at least the first activity threshold to obtain a first indication of activity detected in the first spatial region;
determine a second image difference based on the current successive image and the static image;
determine that the second image difference is at least a second activity threshold to obtain a second indication of activity detected in the second spatial region, with the first activity threshold being less than the second activity threshold; and
detect activity in the second spatial region based on the first and second indications of activity detected in the second spatial region.

15. The POS system of claim 13, wherein the memory includes further instructions executable by the processing circuitry whereby the processing circuitry is configured to:
determine that the first image difference is less than a second inactivity threshold for each successive image obtained during a second time period, with the second inactivity threshold being less than the first inactivity threshold;
determine a second image difference based on the current successive image and the static image;
determine that the second image difference of the current successive frame at the end of the second time period is less than a third inactivity threshold, with the third inactivity threshold being greater than the first and second inactivity thresholds; and
assign one of the successive images obtained during the second time period as the static image.

16. The POS system of claim 13, wherein the memory includes further instructions executable by the processing circuitry whereby the processing circuitry is configured to:
determine that the detected activity in the second spatial region corresponds to the scan of the visual object identifier code of the object while in the second spatial region responsive to determining that the detected activity in the second spatial region is contemporaneous with the scan of the visual object identifier code of the object while in the second spatial region.

* * * * *